(12) United States Patent
Alhadlaq et al.

(10) Patent No.: US 11,209,396 B2
(45) Date of Patent: Dec. 28, 2021

(54) SMART DEWATERING

(71) Applicant: SAUDI ARABIAN OIL COMPANY, Dhahran (SA)

(72) Inventors: Fawaz Alhadlaq, Riyadh (SA); Fawaz A. Alsahan, Dhahran (SA); Omar Z. Alzayed, Riyadh (SA)

(73) Assignee: SAUDI ARABIAN OIL COMPANY

( * ) Notice: Subject to any disclaimer, the term of this patent is extended or adjusted under 35 U.S.C. 154(b) by 8 days.

(21) Appl. No.: 16/806,091

(22) Filed: Mar. 2, 2020

(65) Prior Publication Data

US 2021/0270776 A1   Sep. 2, 2021

(51) Int. Cl.
*G01N 29/024* (2006.01)
*B01D 17/02* (2006.01)
*G01N 29/44* (2006.01)

(52) U.S. Cl.
CPC ....... *G01N 29/024* (2013.01); *B01D 17/0214* (2013.01); *G01N 29/4427* (2013.01); *G01N 2291/02836* (2013.01)

(58) Field of Classification Search
CPC ............. G01N 29/024; G01N 29/4427; G01N 2291/02836; G01N 2035/1025; B01D 17/0214; G01F 23/00; G01F 23/14
USPC ................................................ 73/597, 290 R
See application file for complete search history.

(56) References Cited

U.S. PATENT DOCUMENTS

| 3,892,127 A | 7/1975 | Cirulis et al. |
| 4,236,406 A | 12/1980 | Reed et al. |
| 4,596,136 A | 6/1986 | Zacharias |
| 9,086,354 B2 | 7/2015 | Alsahan et al. |
| 2002/0033356 A1 | 3/2002 | Honda et al. |
| 2003/0075511 A1 | 4/2003 | Nyborg et al. |

(Continued)

OTHER PUBLICATIONS

Skeie et al., "Level estimation in oil/water separators based on multiple pressure sensors and multivariate calibration", Journal of Chemometrics, 2010, p. 387-398, John Wiley & Sons, Ltd.

(Continued)

*Primary Examiner* — Tarun Sinha
(74) *Attorney, Agent, or Firm* — Bracewell LLP; Constance Gall Rhebergen; Jill A. Hecht

(57) ABSTRACT

Embodiments of the disclosure provide a method and system for removing water build-up in a hydrocarbon storage tank. An oil-water interface sensor is located in the hydrocarbon storage tank and includes a first probe and a second probe. The first probe is located at a bottom portion of the hydrocarbon storage tank. The first probe generates a first input data stream. The second probe is located above the first probe. The second probe generates a second input data stream. The first and second input data streams are processed to determine a vertical displacement of an oil-water interface, which is compared against a predetermined value. An output data stream responsive to the comparison is generated including instructions to maintain a controllable valve either in an open position or in a closed position. The output data stream is communicated to the controllable valve, fluidly connected to a drain line connected to the bottom portion of the hydrocarbon storage tank, to be in the open position or in the closed position. Water build-up is removed via the drain line as the controllable valve is maintained in the open position.

20 Claims, 3 Drawing Sheets

(56) References Cited

U.S. PATENT DOCUMENTS

| | | | |
|---|---|---|---|
| 2012/0017998 A1* | 1/2012 | Al-Sahan | C10G 33/08 137/1 |
| 2015/0175463 A1* | 6/2015 | Joensen | B01D 17/0214 210/742 |
| 2016/0288017 A1 | 10/2016 | Hall | |
| 2018/0119031 A1 | 5/2018 | Haworth et al. | |

OTHER PUBLICATIONS

ISRWO dated Jun. 8, 2021, in the prosecution of International Application No. PCT/US2021/070211, 14 pages.

* cited by examiner

SMART DEWATERING

BACKGROUND

Field of the Disclosure

Embodiments of the disclosure generally relate to dewatering a hydrocarbon storage tank. More specifically, embodiments of the disclosure relate to a method and system for removing water level build-up in a hydrocarbon storage tank.

Description of the Related Art

Water level build-up in hydrocarbon storage tanks is an unfortunate and inevitable side effect in oil production. In order to avoid sending this unwanted byproduct to downstream refineries, operators manually discharge the water from the storage tank using drain lines. However, this task requires large amounts of man-power, which prevents the operators from focusing on more important tasks, as well as placing the operators at risk of injury or exposure to chemicals. In addition, failure to adequately drain water from the hydrocarbon tanks can cause processing issues for subsequent refineries.

Automatic tank dewatering apparatuses have been introduced; however, they suffer from serious drawbacks such as: requiring major modifications in the tank or the drain piping for installation, requiring frequent calibration and maintenance, running the risk of service buildup on the sensors or transducers, and having high costs to implement. In addition, automatic tank dewatering apparatuses do not measure the presence or quantity of water in the hydrocarbon storage tank. Typically, the presence or quantity of water is determined when a dewatering cycle is initiated such that fluids are flowing in the drain pipe. However, losses of certain quantities of hydrocarbons flowing in the drain pipe are inevitable when the dewatering cycle is initiated.

SUMMARY

Embodiments of the disclosure generally relate to dewatering a hydrocarbon storage tank. More specifically, embodiments of the disclosure relate to a method and system for removing water level build-up in a hydrocarbon storage tank.

Advantageously, embodiments of the disclosure provide a method and system for automatically draining water from a hydrocarbon storage tank using an oil-water interface sensor, an analytics sensor, a control system and a controllable valve.

Embodiments of the disclosure provide a method for removing water build-up in a hydrocarbon storage tank. The water build-up creates an oil-water interface in the hydrocarbon storage tank. The method includes the step of generating a first input data stream and a second input data stream using an oil-water interface sensor located in the hydrocarbon storage tank. The oil-water interface sensor includes a first probe and a second probe. The first probe is located at a bottom portion of the hydrocarbon storage tank. The first probe generates the first input data stream. The second probe is located above the first probe. The second probe generates the second input data stream. The method includes the step of processing the first input data stream and the second input data stream to determine a vertical displacement of the oil-water interface. The method includes the step of comparing the vertical displacement of the oil-water interface against a first predetermined value. The method includes the step of generating an output data stream responsive to the comparing step. The output data stream includes instructions to maintain a controllable valve either in an open position or in a closed position. The method includes the step of communicating the output data stream to the controllable valve such that the controllable valve is maintained either in the open position or in the closed position. The controllable valve is fluidly connected to a drain line. The drain line is fluidly connected to the bottom portion of the hydrocarbon storage tank. The water build-up is removed via the drain line as the controllable valve is maintained in the open position.

In some embodiments, the second probe is tethered from a top portion of the hydrocarbon storage tank. In some embodiments, the first probe and the second probe are located on a side wall of the hydrocarbon storage tank. In some embodiments, the first probe is located below the oil-water interface and the second probe is located above the oil-water interface. In some embodiments, the first probe and the second probe are pressure sensors. The first input data stream and the second input data stream include hydraulic pressure data. In some embodiments, the method further includes the step of generating a third input data stream using the oil-water interface sensor. The oil-water interface sensor includes a temperature sensor. The third input data stream includes liquid temperature data. In the processing step, the third input data stream is used to correct density values of liquid hydrocarbon and water present in the hydrocarbon storage tank. In some embodiments, the first probe and the second probe are sound velocity sensors. The first input data stream and the second input data stream include sound velocity data. In some embodiments, the method further includes the step of generating a third input data stream using the oil-water interface sensor. The oil-water interface sensor includes a temperature sensor. The third input data stream includes liquid temperature data. In the processing step, the third input data stream is used to correct sound velocity values in liquid hydrocarbon and water present in the hydrocarbon storage tank. In some embodiments, one of the first probe and the second probe includes a transducer and one of the first probe and the second probe includes a receiver. In some embodiments, the method includes the step of monitoring integrity of the controllable valve using an analytics sensor. The analytics sensor is located on a vertical section of the drain line. In some embodiments, the analytics sensor is a sound velocity sensor. In some embodiments, the method further includes the step of generating a fourth input data stream using the analytics sensor. The fourth input data stream includes sound velocity data. The method further includes the step of comparing sound velocity against a second predetermined value. In some embodiments, the method further includes the step of providing an alarm to an operator responsive to the comparing sound velocity step.

Embodiments of the disclosure also provide a dewatering system for removing water build-up in a hydrocarbon storage tank. The water build-up creates an oil-water interface in the hydrocarbon storage tank. The dewatering system includes the hydrocarbon storage tank, an oil-water interface sensor, a drain line, a controllable valve, an analytics sensor, and a control system. The oil-water interface sensor is located in the hydrocarbon storage tank. The oil-water interface sensor includes a first probe and a second probe. The first probe is located at a bottom portion of the hydrocarbon storage tank. The first probe generates a first input data stream. The second probe is located above the first probe. The second probe generates a second input data stream. The drain line is fluidly connected to the bottom portion of the hydrocarbon storage tank. The controllable valve is fluidly connected to the drain line. The controllable valve is configured to remove the water build-up via the drain line in an open position. The analytics sensor is located on a vertical section of the drain line. The analytics sensor is configured to monitor integrity of the controllable valve. The control system is electronically connected to the first probe, the second probe, the controllable valve, and the analytics sensor. The control system is configured to receive and process the first input data stream and the second input data stream to determine a vertical displacement of the oil-water interface. The control system is configured to make a comparison of the vertical displacement of the oil-water interface against a first predetermined value. The control system is configured to generate an output data stream responsive to the comparison. The control system is configured to transmit the output data stream to the controllable valve. The output data stream includes instructions to maintain the controllable valve either in the open position or in a closed position.

In some embodiments, the second probe is tethered from a top portion of the hydrocarbon storage tank. The first probe is located below the oil-water interface and the second probe is located above the oil-water interface. In some embodiments, the first probe and the second probe are pressure sensors. The first input data stream and the second input data stream include hydraulic pressure data. In some embodiments, the oil-water interface sensor includes a temperature sensor. The temperature sensor generates a third input data stream including liquid temperature data. The third input data stream is received and processed by the control system to correct density values of liquid hydrocarbon and water present in the hydrocarbon storage tank. In some embodiments, the first probe and the second probe are sound velocity sensors. The first input data stream and the second input data stream include sound velocity data. In some embodiments, the oil-water interface sensor includes a temperature sensor. The temperature sensor generates a third input data stream including liquid temperature data. The third input data stream is received and processed by the control system to correct sound velocity values in liquid hydrocarbon and water present in the hydrocarbon storage tank. In some embodiments, the analytics sensor is a sound velocity sensor. The sound velocity sensor generates a fourth input data stream including sound velocity data. The fourth input data stream is received and processed by the control system to make a comparison of sound velocity against a second predetermined value.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

Figure 1:
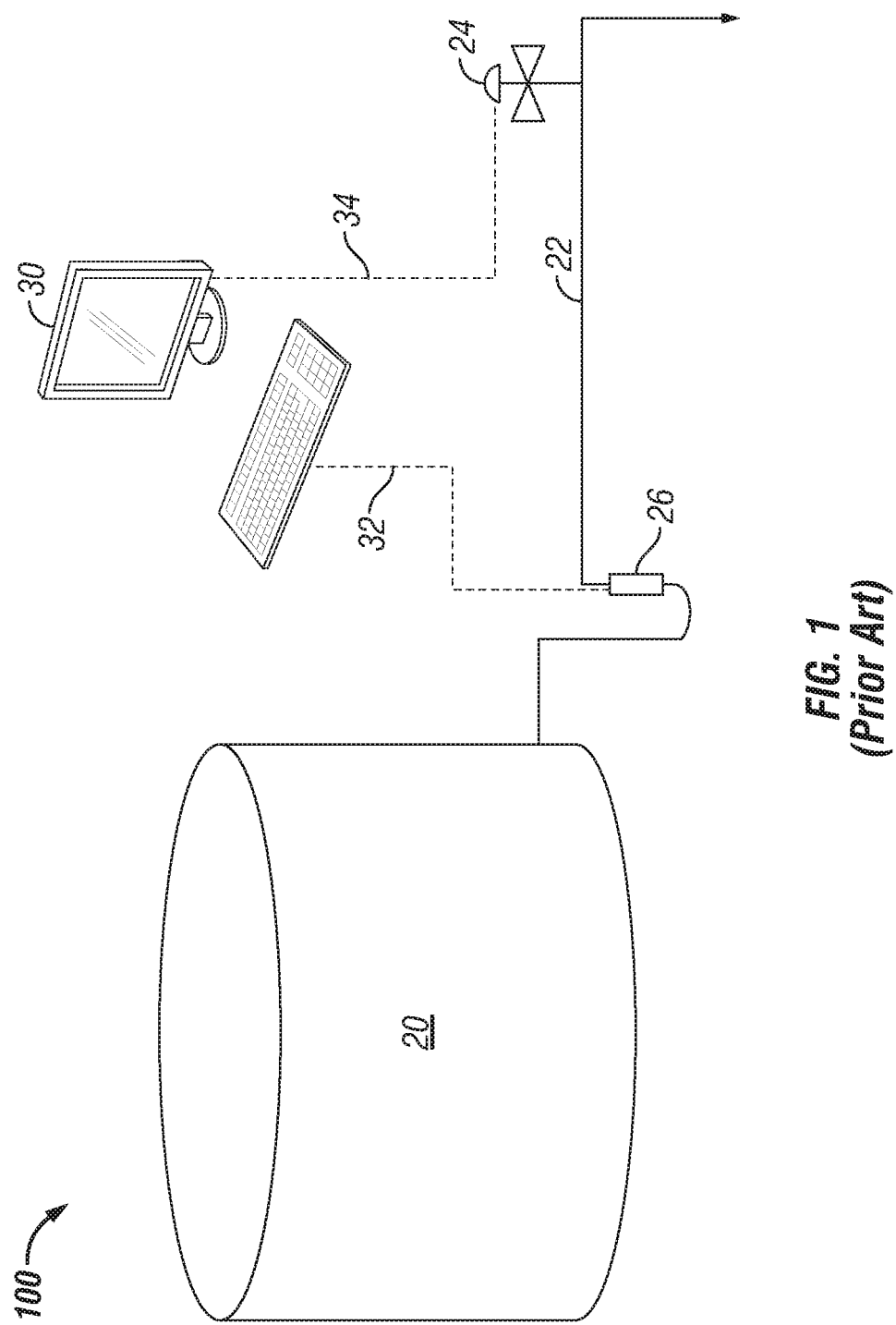
FIG. 1 is a schematic diagram of a prior art dewatering system.

In the accompanying Figures, similar components or features, or both, may have a similar reference label.

DETAILED DESCRIPTION

The disclosure refers to particular features, including process or method steps and systems. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words such are for descriptive convenience and are not limiting unless otherwise indicated.

FIG. 1 shows a schematic diagram of a prior art dewatering system 100. The dewatering system 100 includes dewatering tank 20, drain line 22, sound velocity detector 26, control system 30, electronic wiring 32, 34, and controllable valve 24.

Dewatering tank 20 contains hydrocarbons and water. Because the hydrocarbons are less dense than the water, the hydrocarbons float to the top, and the water settles to the bottom, thus forming two layers. Drain line 22 is generally located on the bottom portion of dewatering tank 20 in order to remove water as opposed to hydrocarbons. Sound velocity detector 26 is located on a vertical section of drain line 22 in order to ensure that there is a full volumetric flow at the point where the measurements are being taken. Control system 30 is in electronic communication 32 with sound velocity detector 26. Control system 30 is in electronic communication 34 with controllable valve 24. Controllable valve 24 is open when only water is detected and is closed when oil is detected.

Sound velocity detector 26 detects and passes water during a dewatering sequence. The dewatering sequence continues until sound velocity detector 26 detects hydrocarbons which triggers the closing of controllable valve 24. Because sound velocity detector 26 must detect hydrocarbons to terminate the dewatering sequence, drain line 22 inevitably includes a certain degree of hydrocarbons between sound velocity detector 26 and controllable valve 24. In some embodiments, the residual hydrocarbons trapped in drain line 22 could result in damage to controllable valve 24. This leads to necessarily flushing drain line 22 in order to reinitiate the dewatering sequence.

Figure 2:
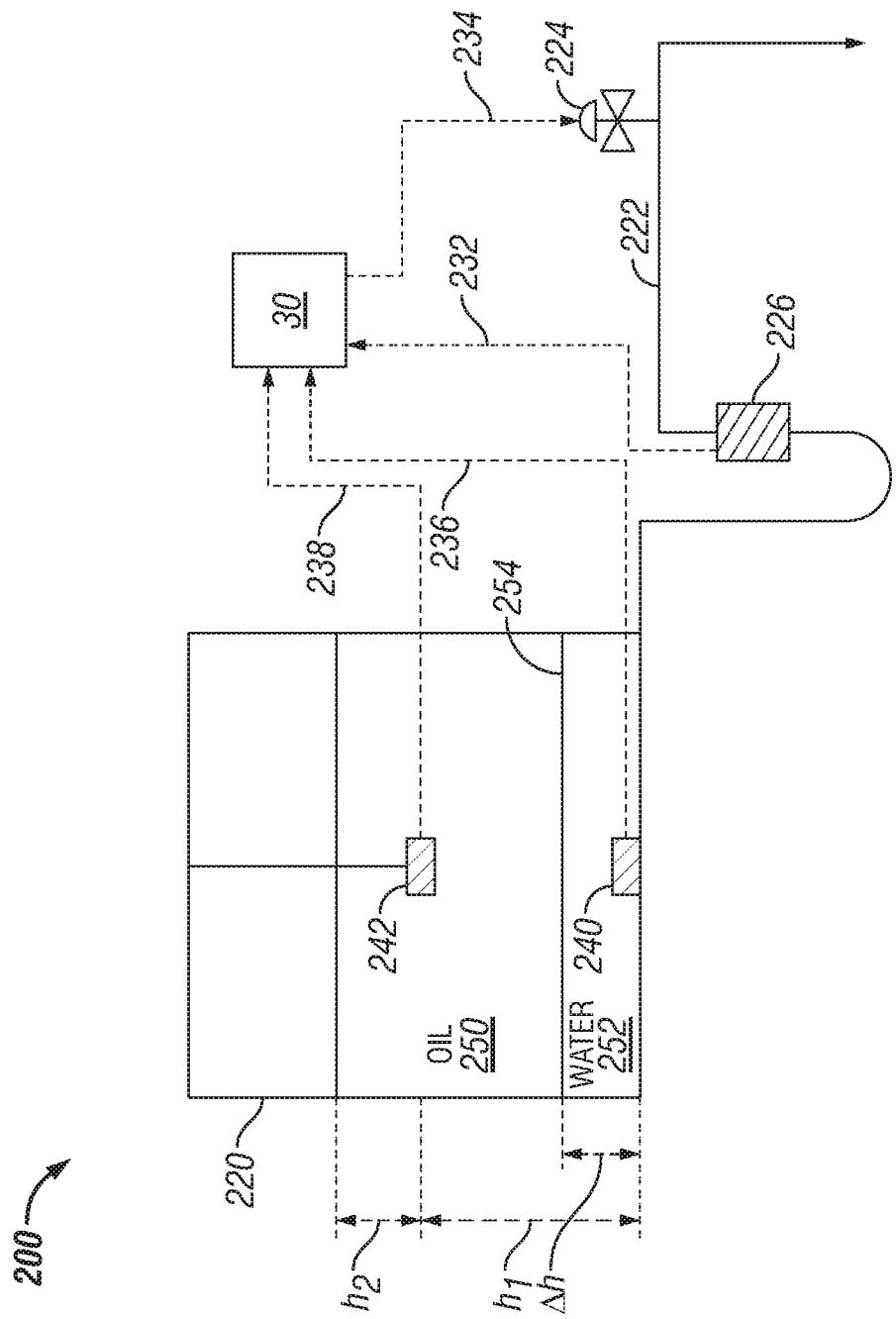
FIG. 2 is a schematic diagram of a dewatering system, according to an embodiment of the disclosure.

FIG. 2 shows a schematic diagram of a dewatering system 200, according to an embodiment of the disclosure. The dewatering system 200 includes dewatering tank 220, drain line 222, oil-water interface sensor including first probe 240 and second probe 242, analytics sensor 226, control system 230, electronic wiring 232, 234, 236, 238, and controllable valve 224.

Dewatering tank 220 contains hydrocarbons and water. Because the hydrocarbons are less dense than the water, the hydrocarbons float to the top, and the water settles to the bottom, thus forming two layers, hydrocarbon layer 250 and water layer 252. The vertical displacement of the oil-water interface 254 is calculated by processing certain data generated via first probe 240 and second probe 242, which are located inside of dewatering tank 220. As a non-limiting example, first probe 240 can be generally located close to or at the bottom portion of dewatering tank 220. First probe 240 can be tethered from the top of the dewatering tank 220. Second probe 242 can be located in hydrocarbon layer 250 by tethering it from the top of dewatering tank 220. In alternate embodiments, first probe 240 and second probe 242 can be located on the side wall of dewatering tank 220. Control system 230 is in electronic communication 236, 238 with first probe 240 and second probe 242, respectively. Drain line 222 is generally located close to or at the bottom portion of dewatering tank 220 in order to remove water as opposed to hydrocarbons. Analytics sensor 226 is located on a vertical section of drain line 222 in order to ensure that there is a full volumetric flow at the point where the measurement is being taken. Control system 230 is in electronic communication 232 with analytics sensor 226. Control system 230 is in electronic communication 234 with controllable valve 224. Controllable valve 224 is in its open configuration during a dewatering sequence. Controllable valve 224 is in its closed configuration before the dewatering sequence or when the dewatering sequence is ceased.

In some embodiments, first probe 240 and second probe 242 can include pressure sensors. The pressure sensors can provide hydraulic pressure data to control system 230 wiredly or wirelessly using communication protocols known in the art. In an embodiment, each of the pressure sensors can generate the hydraulic pressure data at its predetermined height and communicate the hydraulic pressure data to control system 230. Control system 230 calculates the vertical displacement of oil-water interface 254 to determine whether to maintain controllable valve 224 in the open or closed configuration. For example, if the vertical displacement of oil-water interface 254 is greater than a predetermined value, control system 230 can transmit an output signal to controllable valve 224 to be in its open configuration. In this manner, the dewatering sequence can be initiated to drain water. Conversely, if the vertical displacement of oil-water interface 254 is less than a predetermined value, control system 230 can transmit an output signal to controllable valve 224 to be in its closed configuration. In this manner, the dewatering sequence can be ceased. Optionally, oil-water interface sensor can include a temperature sensor to generate liquid temperature data and communicate the liquid temperature data to control system 230. Control system 230 can adjust the temperature-dependent density values of each of hydrocarbon layer 250 and water layer 252. In some embodiments, control system 230 can calculate the vertical displacement of the top surface of hydrocarbon layer 250.

The vertical displacement of oil-water interface 254 (denoted as $\Delta h$) can be calculated by using the following formula (1):

$$\Delta h = \frac{P_1 - P_2 - \rho_o g h_1}{g(\rho_w - \rho_o)} \qquad (1)$$

where the vertical displacement between first probe 240 and second probe 242 is denoted as $h_1$, the vertical displacement between second probe 242 and the top of hydrocarbon layer 250 is denoted as $h_2$, hydraulic pressure data measured by first probe 240 is denoted as $P_1$, hydraulic pressure data measured by second probe 242 is denoted as $P_2$, density of hydrocarbon layer 250 is denoted as $\rho_o$, density of water layer 252 is denoted as $\rho_w$, and gravitational acceleration is denoted as g.

In alternate embodiments, first probe 240 and second probe 242 can include sound velocity sensors. One of the first probe 240 and second probe 242 can include a transducer. The other of first probe 240 and second probe 242 can include a receiver. In other embodiments, the first probe 240 and second probe 242 can include a transceiver. The sound velocity sensors can measure the sound velocity of a transmitted sound wave travelling through oil layer 250 and water layer 252 between first probe 240 and second probe 242. The sound velocity sensors can provide sound velocity data to control system 230 wiredly or wirelessly using communication protocols known in the art. In an embodiment, the sound velocity sensors can generate the sound velocity data and communicate the sound velocity data to control system 230. Control system 230 calculates the vertical displacement of oil-water interface 254 to determine whether to maintain controllable valve 224 in the open or closed configuration. For example, if the vertical displacement of oil-water interface 254 is greater than a predetermined value, control system 230 can transmit an output signal to controllable valve 224 to be in its open configuration. In this manner, the dewatering sequence can be initiated to drain water. Conversely, if the vertical displacement of oil-water interface 254 is less than a predetermined value, control system 230 can transmit an output signal to controllable valve 224 to be in its closed configuration. In this manner, the dewatering sequence can be ceased. Optionally, oil-water interface sensor can include a temperature sensor to collect liquid temperature data and communicate the liquid temperature data to control system 230. Control system 230 can adjust the temperature-dependent sound velocity values in each of hydrocarbon layer 250 and water layer 252. In some embodiments, control system 230 can calculate the vertical displacement of the top surface of hydrocarbon layer 250.

In some embodiments, analytics sensor 226 can include a sound velocity sensor.

Analytics sensor 266 can include a transceiver. In other embodiments, analytics sensor 266 can include two sensors, a transmitter and a receiver. The sound velocity sensor can measure the sound velocity of a transmitted sound wave travelling across drain line 222 where water fully encompasses the inner volume of drain line 222 at the point of measurement. The sound velocity sensor can also measure flow rate and volume of the liquid at the point of measurement in drain line 222. The sound velocity sensor can provide sound velocity data to control system 230 wiredly or wirelessly using communication protocols known in the art. In an embodiment, the sound velocity sensor can generate the sound velocity data and communicate the sound velocity data to control system 230. Control system 230 can determine whether there is a deviation in the continuously provided sound velocity data which is indicative of non-water media present in drain line 222. For example, a sound velocity at any given moment less than a predetermined value can be indicative of hydrocarbon present in drain line 222 due to a reduction in density. In an embodiment, an alarm can be provided to an operator when non-water media is detected in drain line 222. In an embodiment, control system 230 can transmit an output signal to controllable vale 224 to be in its closed configuration such that drainage of hydrocarbons is prevented. In this manner, the dewatering sequence can be ceased. Advantageously, analytics sensor 226 can be used as a backup to oil-water interface sensor in the event oil-water interface sensor is not properly operating.

In some embodiments, analytics sensor 226 can monitor the integrity of controllable valve 224. Analytics sensor 226 can provide information whether controllable valve 224 is defective. For example, a defective controllable valve 224 can be observed if analytics sensor 226 detects a flow in drain line 222 in the event controllable valve 224 is in its closed configuration. In addition, a defective controllable valve 224 can be observed if analytics sensor 226 detects a flow in drain line 222 despite control system 230 transmitting an output signal to close controllable valve 224.

In some embodiments, control system 230 can be a distributed control system (DCS), a terminal monitoring system (TMS), a programmable logic controller (PLC), or any other similar customizable control system. Control system 230 can be either mounted in the field or in a control room. Control system 230 is operable to receive hydraulic pressure data or sound velocity data from first probe 240 and second probe 242. Control system 230 is operable to receive sound velocity data from analytics sensor 226. Control system 230 is operable to generate and transmit output data to controllable valve 224. Control system 230 is operable to display such data. Such data can be in analog or digital form.

Controllable valve 224 can be any type of automatically operated valve that provides zero-leakage. Non-limiting examples of controllable valve 224 include an air-operated valve with a solenoid, a motor operated valve (MOV), or the like. Non-limiting examples of controllable valve 224 also include a gate valve, a ball valve, a butterfly valve, or the like.

As shown in FIG. 2, the dewatering sequence is initiated or ceased based on certain data generated by oil-water interface sensor which is located inside the hydrocarbon storage tank. Because oil-water interface sensor is capable of detecting the presence of water inside the hydrocarbon storage tank, the dewatering sequence can be initiated only when water is present in the hydrocarbon storage tank. In this manner, an accidental drainage of hydrocarbons in the absence of water can be prevented. In addition, because oil-water interface sensor is located inside the hydrocarbon storage tank, the dewatering sequence can be ceased before having any hydrocarbons trapped in drain line 222. Accordingly, damage to controllable valve 224 can be prevented and flushing drain line 222 is no longer a necessary step when reinitiating the dewatering sequence.

Figure 3:
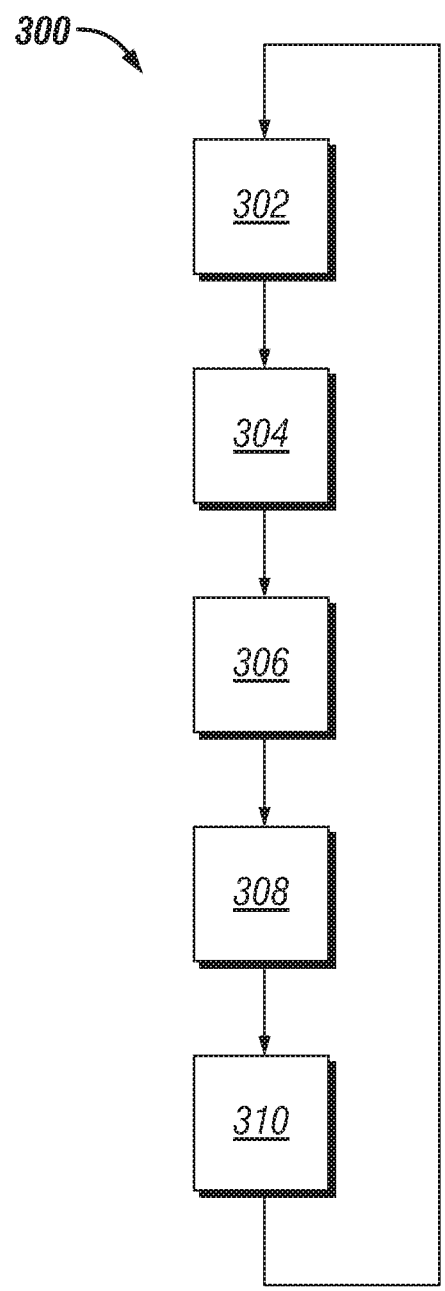
FIG. 3 is a schematic diagram of a process for removing water in a hydrocarbon storage tank, according to an embodiment of the disclosure.

FIG. 3 is a schematic representation of a process 300 for removing water in a hydrocarbon storage tank 220, according to an embodiment of the disclosure.

In block 302, a first input data stream and a second input data stream are generated using an oil-water interface sensor located in hydrocarbon storage tank 220. The oil-water interface sensor includes first probe 240 and second probe 242. First probe 240 is located at a bottom portion of hydrocarbon storage tank 220. First probe 240 generates the first input data stream. Second probe 242 is located above first probe 240. Second probe 242 generates the second input data stream.

In block 304, the first input data stream and the second input data stream are communicated to control system 230. Control system 230 processes the first input data stream and the second input data stream to determine a vertical displacement of oil-water interface 254.

In block 306, control system 230 compares the calculated vertical displacement of oil-water interface 254 against a predetermined value.

In block 308, control system 230 generates an output data stream responsive to the comparison made in block 306. The output data stream includes instructions to maintain controllable valve 224 either in the open configuration or in the closed configuration. For example, if the vertical displacement of oil-water interface 254 is greater than the predetermined value, the output data stream can include instructions to maintain controllable valve 224 in the open configuration. If the vertical displacement of oil-water interface 254 is less than the predetermined value, the output data stream can include instructions to maintain controllable valve 224 in the closed configuration.

In block 310, the output data stream is communicated to controllable valve 224.

Controllable valve 224 is either in the open configuration or in the closed configuration depending on the instructions included in the output data stream. A dewatering sequence is initiated when controllable valve 224 changes from the closed configuration to the open configuration. A dewatering sequence is ceased when controllable valve 224 changes from the open configuration to the closed configuration.

Example

The disclosure is illustrated by the following examples, which are presented for illustrative purposes only, and are not intended as limiting the scope of the invention which is defined by the appended claims.

A system having a configuration similar to FIG. 2 was used to determine the vertical displacement of the oil-water interface of a dewatering tank. The dewatering tank was a crude oil tank located at Riyadh Refinery, Saudi Arabia. Two pressure sensors were used as the probes. The first probe was placed about 0.19 meters above the bottom portion of the dewatering tank, tethered from the top of the dewatering tank. The second probe was placed about 5 meters vertically above the first probe, also tethered from the top of the dewatering tank. A manual gauge was installed to verify the vertical displacement of the oil-water interface determined by the two probes. Density of the oil present in the dewatering tank was about 0.8709 kilogram per cubic decimeter ($kg/dm^3$). Density of the water present in the dewatering tank was about 1.004 $kg/dm^3$. The results are shown in Table 1. The reading values correspond to the vertical displacement of the oil-water interface above the first probe.

TABLE 1

| Measurement No. | Manual Gauge Reading (m) | Probe Reading (m) |
| --- | --- | --- |
| 1 | 0.215 | 0.202 |
| 2 | 0.215 | 0.205 |
| 3 | 0.24 | 0.221 |
| 4 | 0.24 | 0.225 |
| 5 | 0.24 | 0.214 |
| 6 | 0.24 | 0.225 |
| 7 | 0.24 | 0.227 |
| 8 | 0.24 | 0.221 |
| 9 | 0.08 | 0.11 |
| 10 | 0.06 | 0.11 |
| 11 | 0 | 0.07 |
| 12 | 0 | 0.08 |
| 13 | 0 | 0.08 |

The results show that the oil-water interface determined by the two probes placed in the dewatering tank was in general agreement with the manual gauge reading.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for removing water build-up in a hydrocarbon storage tank, wherein the water build-up creates an oil-water interface in the hydrocarbon storage tank, the method comprising the steps of:
generating a first input data stream and a second input data stream using an oil-water interface sensor located in the hydrocarbon storage tank, the oil-water interface sensor comprising:
a first probe, the first probe located at a bottom portion of the hydrocarbon storage tank, the first probe generating the first input data stream; and
a second probe, the second probe located above the first probe, the second probe generating the second input data stream;
processing the first input data stream and the second input data stream to locate a vertical displacement of the oil-water interface in the hydrocarbon storage tank;
comparing the vertical displacement of the oil-water interface against a first predetermined value;
generating an output data stream responsive to the comparing step, wherein the output data stream includes instructions to maintain a controllable valve either in an open position or in a closed position; and
communicating the output data stream to the controllable valve such that the controllable valve is maintained either in the open position or in the closed position,
wherein the controllable valve is fluidly connected to a drain line, the drain line fluidly connected to the bottom portion of the hydrocarbon storage tank,
wherein the water build-up is removed via the drain line as the controllable valve is maintained in the open position.

2. The method of claim 1, wherein the second probe is tethered from a top portion of the hydrocarbon storage tank.

3. The method of claim 1, wherein the first probe and the second probe are located on a side wall of the hydrocarbon storage tank.

4. The method of claim 1, wherein the first probe is located below the oil-water interface and the second probe is located above the oil-water interface.

5. The method of claim 1, wherein the first probe and the second probe are pressure sensors, wherein the first input data stream and the second input data stream include hydraulic pressure data.

6. The method of claim 5, further comprising the step of:
generating a third input data stream using the oil-water interface sensor, wherein the oil-water interface sensor includes a temperature sensor, wherein the third input data stream includes liquid temperature data,
wherein the processing step, the third input data stream is used to correct density values of liquid hydrocarbon and water present in the hydrocarbon storage tank.

7. The method of claim 1, wherein the first probe and the second probe are sound velocity sensors, wherein the first input data stream and the second input data stream include sound velocity data.

8. The method of claim 7, further comprising the step of:
generating a third input data stream using the oil-water interface sensor, wherein the oil-water interface sensor includes a temperature sensor, wherein the third input data stream includes liquid temperature data,
wherein the processing step, the third input data stream is used to correct sound velocity values in liquid hydrocarbon and water present in the hydrocarbon storage tank.

9. The method of claim 7, wherein one of the first probe and the second probe includes a transducer and one of the first probe and the second probe includes a receiver.

10. The method of claim 1, further comprising the step of:
monitoring integrity of the controllable valve using an analytics sensor, wherein the analytics sensor is located on a vertical section of the drain line.

11. The method of claim 10, wherein the analytics sensor is a sound velocity sensor.

12. The method of claim 11, further comprising the steps of:
generating a fourth input data stream using the analytics sensor, wherein the fourth input data stream includes sound velocity data; and
comparing sound velocity against a second predetermined value.

13. The method of claim 12, further comprising the step of:
providing an alarm to an operator responsive to the comparing sound velocity step.

14. A dewatering system for removing water build-up in a hydrocarbon storage tank, wherein the water build-up creates an oil-water interface in the hydrocarbon storage tank, the dewatering system comprising:
the hydrocarbon storage tank;
an oil-water interface sensor, the oil-water interface sensor located in the hydrocarbon storage tank, the oil-water interface sensor comprising:
a first probe, the first probe located at a bottom portion of the hydrocarbon storage tank, the first probe generating a first input data stream; and
a second probe, the second probe located above the first probe, the second probe generating a second input data stream;
a drain line, the drain line fluidly connected to the bottom portion of the hydrocarbon storage tank;
a controllable valve, the controllable valve fluidly connected to the drain line, the controllable valve configured to remove the water build-up via the drain line in an open position;
an analytics sensor, the analytics sensor located on a vertical section of the drain line, the analytics sensor configured to monitor integrity of the controllable valve; and
a control system, the control system electronically connected to the first probe, the second probe, the controllable valve, and the analytics sensor, the control system configured to receive and process the first input data stream and the second input data stream to locate a vertical displacement of the oil-water interface in the hydrocarbon storage tank, the control system configured to make a comparison of the vertical displacement of the oil-water interface against a first predetermined value, the control system configured to generate an output data stream responsive to the comparison, the control system configured to transmit the output data stream to the controllable valve,
wherein the output data stream includes instructions to maintain the controllable valve either in the open position or in a closed position.

15. The dewatering system of claim 14, wherein the second probe is tethered from a top portion of the hydrocarbon storage tank, wherein the first probe is located below the oil-water interface and the second probe is located above the oil-water interface.

16. The dewatering system of claim 14, wherein the first probe and the second probe are pressure sensors, wherein the first input data stream and the second input data stream include hydraulic pressure data.

17. The dewatering system of claim 16, wherein the oil-water interface sensor includes a temperature sensor, the temperature sensor generating a third input data stream including liquid temperature data, wherein the third input data stream is received and processed by the control system to correct density values of liquid hydrocarbon and water present in the hydrocarbon storage tank.

18. The dewatering system of claim 14, wherein the first probe and the second probe are sound velocity sensors, wherein the first input data stream and the second input data stream include sound velocity data.

19. The dewatering system of claim 18, wherein the oil-water interface sensor includes a temperature sensor, the temperature sensor generating a third input data stream including liquid temperature data, wherein the third input data stream is received and processed by the control system to correct sound velocity values in liquid hydrocarbon and water present in the hydrocarbon storage tank.

20. The dewatering system of claim 14, wherein the analytics sensor is a sound velocity sensor, the sound velocity sensor generating a fourth input data stream including sound velocity data, wherein the fourth input data stream is received and processed by the control system to make a comparison of sound velocity against a second predetermined value.

* * * * *